United States Patent [19]
Yasuda et al.

[11] Patent Number: 5,158,830
[45] Date of Patent: Oct. 27, 1992

[54] MAGNETIC RECORDING MEDIUM COMPRISING A POLYURETHANE RESIN COATING RESIDUAL GROUPS DERIVED FROM SPECIFIED PHOSPHOROUS CONTAINING COMPOUNDS

[75] Inventors: Masahiko Yasuda; Shigeo Hosokawa; Yorozu Yokomori, all of Mie; Shinichiro Jimbo, Tokyo, all of Japan

[73] Assignee: The B. F. Goodrich Company, Akron, Ohio

[21] Appl. No.: 684,534

[22] Filed: May 9, 1991

Related U.S. Application Data

[62] Division of Ser. No. 426,132, Oct. 24, 1989, Pat. No. 5,037,934.

[30] Foreign Application Priority Data

| Oct. 28, 1988 | [JP] | Japan | 63-271035 |
| May 22, 1989 | [JP] | Japan | 1-126580 |
| Aug. 8, 1989 | [JP] | Japan | 1-203738 |

[51] Int. Cl.$^5$ ............................................. G11B 5/00
[52] U.S. Cl. .................... 428/425.9; 428/694; 428/900; 252/62.54
[58] Field of Search .............. 428/694, 900, 425.9; 252/62.54

[56] References Cited

U.S. PATENT DOCUMENTS

| 3,350,478 | 10/1967 | Cherbuliez et al. | 260/953 |
| 3,350,479 | 10/1967 | Cherbuliez et al. | 260/956 |
| 3,350,480 | 10/1967 | Cherbuliez et al. | 260/961 |
| 3,350,481 | 10/1967 | Cherbuliez et al. | 260/961 |
| 3,365,531 | 1/1968 | Cherbuliez et al. | 260/940 |
| 3,373,231 | 3/1968 | Cherbuliez et al. | 260/956 |
| 3,374,294 | 3/1968 | Cherbuliez et al. | 260/958 |
| 4,571,364 | 2/1986 | Kasuga et al. | 428/336 |
| 4,830,923 | 5/1989 | Sumiya et al. | 428/425.9 |
| 5,045,622 | 9/1991 | Kohno et al. | 528/48 |
| 5,057,373 | 10/1991 | Tokunaga et al. | 428/413 |

*Primary Examiner*—Merrell C. Cashion, Jr.
*Assistant Examiner*—Stevan A. Resan
*Attorney, Agent, or Firm*—Debra L. Pawl; Daniel J. Hudak

[57] ABSTRACT

A magnetic coating formulation is composed principally of magnetic particles and a binder. At least a portion of the binder is a polyurethane resin synthesized from a reactant mixture of specific phosphorus compound, epoxy compound, isocyanate compound and polyfunctional hydroxy compounds. The reactant mixture may optionally contain a chain extender. The polyurethane resin contains one phosphoric acid group or one residual group derived from phosphoric acid per 3,000-200,000 number average molecular weight of the polyurethane resin, and has a number average molecular weight of 4,000-150,000. A magnetic recording medium with a magnetic coating layer formed from the magnetic coating formulation is also disclosed. The magnetic coating layer features not only excellent dispersion of magnetic particles, in other words, excellent magnetic characteristics but also superb durability.

4 Claims, No Drawings

MAGNETIC RECORDING MEDIUM COMPRISING A POLYURETHANE RESIN COATING RESIDUAL GROUPS DERIVED FROM SPECIFIED PHOSPHOROUS CONTAINING COMPOUNDS

This is a division of parent application Ser. No. 07/426,132 filed on Oct. 24, 1989, U.S. Pat. No. 5,037,934.

The present invention relates to magnetic coating formulations, and from another viewpoint to magnetic recording media with a magnetic layer formed principally of magnetic particles and a binder. Magnetic recording media can include, for example, magnetic tapes, magnetic disks, magnetic cards and the like.

In general, a magnetic recording medium carries a magnetic layer which has been formed by coating a base film such as a polyester film with a magnetic coating formulation containing magnetic particles and a binder and then drying the thus-coated formulation.

Binders with various resins incorporated therein have conventionally been used as binders for magnetic recording media. Among these, useful are polyurethane resins, vinyl chloride-vinyl acetate copolymer resins, nitrocellulose and the like. However, these binders do not have sufficient dispersing capacity so that they rely in dispersing capacity upon a dispersant such as soybean lecithin or a phosphoric acid compound. A system formed of a binder and a dispersant blended therein however tends to develop deleterious effects, such as bleeding, on the durability of the magnetic layer when used for a long time.

To improve the problems referred to above, binders having high dispersing capacity have been proposed, in which hydrophilic polar groups such as hydroxyl groups, carboxyl groups, phosphoric acid groups, sulfonic acid groups or the like have been introduced to improve the affinity to magnetic particles (Japanese Patent Applications Laid-Open Nos. 92422/1982, 30235/1984, 154633/1984, 15473/1985, 20315/1985 and 1110/1987).

With the current technical standard in view, there is an outstanding demand for the development of a magnetic recording medium excellent not only in the dispersion of magnetic particles but also in the durability of the magnetic layer.

No one has however succeeded yet to provide a magnetic recording medium which can satisfy both requirements for magnetic recording media, namely, high dispersion of magnetic particles and at the same time high abrasion resistance (i.e., durability) of the magnetic layer. Further, no magnetic coating formulation useful for the production of such magnetic recording media has been provided yet.

It is an object of the present invention to solve the above problems.

The present inventors have found that a magnetic recording medium excellent in the dispersion of magnetic particles can be obtained without impairing the mechanical characteristics of a polyurethane resin when a phosphoric-acid-modified polyurethane resin synthesized by adding a bifunctional isocyanate compound and/or a trifunctional isocyanate compound and a polyfunctional hydroxy compound having a number average molecular weight of 400–5,000 and if desired, a chain extender to a phosphoric-acid-modified polyol — which has been obtained by adding a particular compound containing a phosphoric acid group to an epoxy compound containing at least two epoxy groups and/or an epoxy compound containing one epoxy group and at least one hydroxyl group — and then conducting a urethanation reaction is used as a binder upon production of the magnetic recording medium, leading to the completion of the present invention.

In addition, the present inventors have also found that use of a phosphoric-acid-modified and epoxy-modified polyurethane resin, which has been synthesized by conducting the urethanation reaction in the presence of an epoxy compound, as a binder results in the provision of a magnetic recording medium having a magnetic layer excellent not only in the dispersion of magnetic particles but also in abrasion resistance and durability owing to the high crosslinking degree of the resin. This finding has also led to the completion of this invention.

The present invention therefore provides a magnetic recording medium which comprises a magnetic layer composed principally of magnetic particles and a binder. At least a portion of the binder is a polyurethane resin synthesized from a reactant mixture of components (1), (2), (3) and (4) and/or (5) set out below, containing one phosphoric acid group or one residual group derived from phosphoric acid per 3,000–200,000 number average molecular weight of the polyurethane resin, and having a number average molecular weight of 4,000–150,000 or a polyurethane resin in which phosphoric acid groups or residual groups derived from phosphoric acid, said groups being being contained in the polyurethane resin, have been at least partly neutralized with a base: (1) a phosphorus compound (a) represented by a structural formula set out below or a phosphorus compound (b) represented by a structural formula set out below:

Phosphorus compound (a): a compound ($a_1$) alone or a mixture of the compound ($a_1$) and another compound ($a_2$):

Compound ($a_1$): 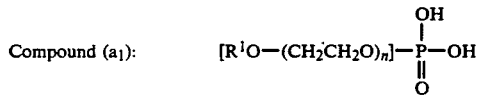

Compound ($a_2$): 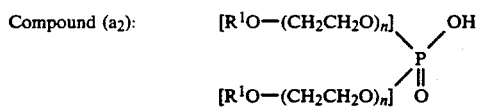

wherein $R^1$ is a hydrogen atom, a phenyl group, an alkyl group having 1–40 carbon atoms, or an alkylphenyl group having 1–40 carbon atoms, and n is an integer of 0–30.

Phosphorus compound (b):

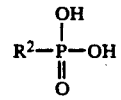

wherein $R^2$ is a phenyl group, an alkyl group having 1–40 carbon atoms, or an alkylphenyl group having 1–40 carbon atoms;

(2) an epoxy compound having at least two epoxy groups and/or an epoxy compound having one epoxy group and at least one hydroxyl group;

(3) a bifunctional isocyanate compound and/or a trifunctional isocyanate compound; and (4) a polyfunctional hydroxy compound having a number average molecular weight of 400–5,000.

The reactant mixture employed upon synthesis of the binder may further comprise a chain extender as component (5).

The present invention has made it possible to provide magnetic recording media having a magnetic coating layer which features not only excellent dispersion of magnetic particles but also superb durability.

The term "residual group derived from phosphoric acid" as used herein means a residual group of a phosphoric acid ester such as a phosphoric acid monoester, phosphoric acid diester or phosphoric acid triester.

Phosphorus Compound

In the present invention, the compound (a) is either the compound $(a_1)$ alone or a mixture of the compound $(a_1)$ and the compound (a2). In the mixture, the ratio of the compound $(a_1)$ to the compound (a2) can range from 100:0 to 10:90. Specific examples include "Gafac RE-410", "Gafac RE-610", "Gafac RE-210", "Gafac RP-710", "Gafac RD-510Y", "Gafac RB-410", "Gafac RS-410", "Gafac RS-610" and "Gafac RB-510", all trade names and products of Toho Chemical Industry Co., Ltd. and GAF Chemicals, as well as monoisodecyl phosphate produced by Daihachi Chemical Industry Co., Ltd. As examples of the compound (b), may be mentioned phenylphosphonic acid and octylphosphonic acid, both produced by Nissan Chemical Industries, Ltd.

Epoxy Compound

Exemplary epoxy compounds include "Epicoat 828", "Epicoat 834", "Epicoat 1001", "Epicoat 1002", "Epicoat 003" and "Epicoat 1004", all trade names for bisphenol A-epichlorohydrin epoxy resins produced by Yuka Shell Epoxy Kabushiki Kaisha; "Epicoat 152" and "Epicoat 154", both trade names for phenolic novolak epoxy resins produced by Yuka Shell Epoxy Kabushiki Kaisha, and "Smiepoxy ELPN-180" and "Smiepoxy ESPN-180", both phenolic novolak epoxy resins produced by Sumitomo Chemical Co., Ltd.; "Smiepoxy ESCN-220L", "Smiepoxy 220F", "Smiepoxy 220HH" and "Smiepoxy ESMN-220L", all trade names for cresolic novolak epoxy resins produced by Sumitomo Chemical Co., Ltd., "EOCN-102", "EOCN-103" and "EOCN-104", all trade names for cresolic novolak epoxy resins produced by Nippon Kayaku Co., Ltd., and "Epicoat 180S", trade name for a cresolic novolak epoxy resin produced by Yuka Shell Epoxy Kabushiki Kaisha; "Epicoat 604", trade name for a tetrafunctional epoxy resin of the glycidyl amine type produced by Yuka Shell Epoxy Kabushiki Kaisha; diethylene glycol diglycidyl ether; bisphenol S diglycidyl ether; spiroglycol diglycidyl ether; resorcine diglycidyl ether; diglycidyl adipate; triglycidyl trishydroxyethyl isocyanurate; pentaerythritol polyglycidyl ether; diglycidyl terephthalate; diglycidyl orthophthalate; neopentyl glycol diglycidyl ether; dibromoneopentyl glycol diglycidyl ether; 1,6-hexanediol diglycidyl ether; sorbitol polyglycidyl ether; glycerol diglycidyl ether; diglycerol diglycidyl ether; glycerol triglycidyl ether; trimethylolpropane diglycidyl ether; trimethylolpropane triglycidyl ether; diglycerol triglycidyl ether; vinylcyclohexene dioxide; dicyclopentadiene dioxide; 3,4-epoxy-6-methylcyclohexylmethyl 3,4-epoxy-6-methylcyclohexanecarbonate; alicyclic diepoxy adipate; diglycidyl tetrahydrophthalate; diglycidyl hexahydrophthalate; diglycidylparaoxybenzoic acid; trihydroxybiphenyl triglycidyl ether; tetraglycidylbenzophenone; bisresorcinol tetraglycidyl ether; bisphenol hexafluoroacetone diglycidyl ether; 1,1-bis[4'-(2,3-epoxypropaxy)phenyl]-cyclohexane; hydroxydicyclopentadiene monoxide; bis(3,4-epoxy-6-methyl-cyclohexylmethyl) adipate; and 3,4-epoxycyclohexylmethyl 3,4-epoxycyclohexanecarboxylate.

As a monofunctional epoxy compound, may be mentioned glycidol (2,3-epoxy-1-propanol) produced by Nippon Oil & Fats Co., Ltd.

Isocyanate Compound

As the isocyanate compound, the following compounds can be used by way of example:

2,4-tolylene diisocyanate (may be abbreviated as "TDI"); 2,6-tolylene diisocyanate; p-phenylene diisocyanate; diphenylmethane diisocyanate (may be abbreviated as "MDI"); m-phenylene diisocyanate; hexamethylene diisocyanate; tetramethylene diisocyanate; 3,3'-dimethoxy-4,4'-biphenylene diisocyanate; 2,4-naphthalene diisocyanate; 3,3'-dimethyl-4,4-biphenylene diisocyanate; 4,4'-diphenylene diisocyanate; 4,4'-diisocyanato diphenyl ether; 1,5-naphthalene diisocyanate; p-xylylene diisocyanate; m-xylylene diisocyanate; 1,3-diisocyanato methylcyclohexane; 1,4-diisocyanato methylcyclohexane; 4,4'-diisocyanato dicyclohexane; 4,4'-diisocyanato dicyclohexylmethane; and isophorone diisocyanate.

If necessary, 2,4,4'-triisocyanato diphenyl, benzene triisocyanate or the like can also be used in a small amount.

Polyfunctional Hydroxy Compound

A polyester polyol, polyether polyol or the like can be used as the polyfunctional hydroxy compound, namely, polyol in the present invention.

Exemplary polyester polyols include adipate polyols such as polyethylene adipate polyols, polybutylene adipate polyols, polyethylenepropylene adipate polyols and cyclohexane dimethanol adipate; terephthalic acid polyols, e.g., "Vyron RUX" and "Vyron RV-200", both trade names and produced by Toyobo Co., Ltd.; and polycaprolactone polyols, e.g., "Placcel 212", "Placcel 220", "Placcel 208" and "Placcel 210", all trade names and produced by Daicel Chemical Industries, Ltd.

On the other hand, usable exemplary polyether polyols include polyoxyethylene glycol; polyoxypropylene glycol; polyoxyethylene polyoxypropylene polyols; and polyoxytetramethylene polyols, e.g., "PTG 1000" and "PTG 2000", both trade names and produced by Hodogaya Chemical Co., Ltd.

Other usable illustrative polyfunctional hydroxy compounds include polycarbonate polyols, e.g., "Desmophen 2020E" (trade name, product of Bayer AG, W. Germany), and "Carbodiol D-1000" and "Carbodiol D-2000"(trade names, products of Toagosei Chemical Industry Co., Ltd.); polybutadiene polyols, e.g., "G-1000", "G-2000" and "G-3000" (trade names, products of Nippon Soda Co., Ltd.); 3-methyl-1,5-pentane adipate polyols, e.g., "PMPA 1000" and "PMPA 2000" (trade names, products of Kuraray Co., Ltd.); polypentadiene polyols; castor oil polyols; and $\beta$-methyl-$\delta$-valerolactone polyols, e.g., "PMVL 1000" and "PMVL 2000" (trade names, products of Kuraray Co., Ltd.).

These polyols can be used either singly or in combination.

Phosphoric-Acid-Modified Polyol

In the present invention, the phosphoric-acid-modified polyol can be obtained by reacting an epoxy compound and the above compound (a) or (b) at 40–120° C., preferably at 60–100° C. in the presence or absence of a solvent.

Preferred solvents include methyl ethyl ketone, methyl isobutyl ketone, toluene, cyclohexanone, tetrahydrofuran, etc. These solvents can be used either singly or in combination.

Regarding the charge ratio of the compound (a) or (b) to the epoxy compound, 2:1 molar ratio is preferred for the compound (a) while 1:1 molar ratio is preferred for the compound (b). However, the epoxy compound may be charged in excess. Further, the above reaction may be conducted in the presence of a polyfunctional polyol and/or a chain extender.

Chain Extender

Exemplary chain extenders include bifunctional to hexafunctional polyols having a molecular weight of 500 or lower as well as diamines and alkanolamines containing one or two terminal primary or secondary amino groups and having a molecular weight of 500 or lower.

Suitable illustrative chain extenders include the following compounds:

(a) Polyols:

Ethylene glycol, diethylene glycol, propylene glycol, dipropylene glycol, 1,4-butylene glycol, 1,3-butanediol, 1,6-hexylene glycol, glycerin, trimethylolpropane, 3-methyl-3-hydroxy-1,5-pentanediol, pentaerythritol, sorbitol, 1,4-cyclohexanediol, 1,4-cyclohexane-dimethanol, xylylene glycol, neopentyl glycol, 3-methyl-1,5-pentanediol, 2-ethyl-1,3-hexanediol, 3-methyl-1,3-butanediol.

(b) Diamines:

Diamines such as hydrazine, ethylenediamine, tetramethylenediamine, hexamethylenediamine, and 1,4-cyclohexanediamine.

(c) Alkanolamines:

Alkanolamines such as ethanolamine, diethanolamine and triethanolamine. (d) Hydroquinone, pyrogallol, 4,4-isopropylidenediphenol, bisphenol A and polyols obtained by adding propylene oxide and/or ethylene oxide in an arbitrary order to the above-described polyols, diamines and alkanolamines and having a molecular weight of 500 or lower.

(e) Dihydroxycarboxylic acids such as 2,2-dimethylolpropionic acid and tartaric acid.

Urethanation Reaction

In the presence or absence of a solvent, the bifunctional isocyanate compound and/or the trifunctional isocyanate compound and the polyfunctional hydroxy compound having the number average molecular weight of 400–5,000 and if necessary the chain extender are added to the phosphoric-acid-modified polyol. In a manner known per se in the art, they are thereafter subjected to the urethanation reaction by the one-shot process or the prepolymer process, thereby synthesizing the phosphoric-acid-modified polyurethane resin. In the reaction, a urethanation catalyst such as di-n-butyltin dilaurate, tin octylate or triethylenediamine can also be used.

Further, a phosphoric-acid-modified and epoxy-modified resin having a more highly branched structure and a higher hydroxyl content can be produced provided that an epoxy compound having at least two epoxy groups and/or an epoxy compound having one epoxy group and at least one hydroxy group is added upon conducting the urethanation reaction.

When the epoxy compound is added, the reaction temperature of the urethanation may be 50–160° C., preferably 70–120° C. in the presence of a solvent or 70–240° C., preferably 120–220° C. in the absence of a solvent.

In addition, upon production of the phosphoric-acid-modified polyol described above, the epoxy compound can be added in an excess amount to leave a portion of the epoxy compound or epoxy groups unreacted. This remaining unreacted portion of the epoxy compound or epoxy groups can then be used as an epoxy compound upon conducting the urethanation reaction.

The phosphoric-acid-modified and epoxy-modified polyurethane resin synthesized as described above has a high crosslink density and a high hydroxyl content. Hydroxyl groups in its molecular chain or at its molecular terminals react with the polyfunctional low-molecular isocyanate compound during a drying step of a resulting magnetic coating formulation, thereby making it possible to obtain a magnetic recording medium with a magnetic coating layer having a still higher crosslink density and excellent abrasion resistance and durability.

Illustrative reaction solvents include tetrahydrofuran, methyl ethyl ketone, methyl isobutyl ketone, cyclohexanone, dimethylformamide, toluene and xylene. These solvents can be used either singly or in combination.

Polyurethane Resin

The number average molecular weight of the polyurethane resin in this invention can be 4,000–150,000, with 5,000–60,000 being preferred. If this number average molecular weight is too low, it will be difficult to draw out sufficient effects for the improvement of the durability of the magnetic coating layer. On the other hand, unduly high number average molecular weights will lead to inconvenience such that the resulting magnetic coating formulation will have a high viscosity.

Incidentally, phosphoric acid groups or residual groups derived from phosphoric acid, which are contained in the polyurethane resin useful in the practice of this invention, may be neutralized with a base either in part or in toto.

The base may be any organic base or inorganic base insofar as it can neutralize phosphoric acid groups or residual groups derived from phosphoric acid. Such organic and inorganic bases can be used either singly or in combination.

Exemplary inorganic bases include lithium hydroxide, sodium hydroxide, potassium hydroxide and ammonia.

On the other hand, illustrative organic bases include amines and derivatives thereof, such as monomethylamine, dimethylamine, trimethylamine, monoethylamine, diethylamine, triethylamine, tributylamine, trioctylamine, tridecylamine, dimethylethanolamine, monoethanolamine, diethanolamine, triethanolamine, morpholine, pyridine, piperazine, piperidine, aniline, dimethylaniline and picoline; hindered amines such as dimethyl succinate-1-(2-hydroxyethyl)-4-hydroxy-2,2,6,6-tetramethylpiperidine polycondensation product; cationic polymers such as polyvinylamine; and quaternary ammonium hydroxide such as dodecyldiethylpropylammonium hydroxide.

When a polyurethane resin obtained in a neutralized form by using these bases either singly or in combination is employed as a binder, a modified interaction can be developed between the binder and the surfaces of magnetic particles. Still better dispersing capacity can be obtained depending on the kind of the magnetic particles.

In the case of a urethane resin of the polyester type, the neutralization of acidic groups makes it possible to prevent deterioration of the resin which would otherwise take place when stored over a long period of time.

Although these polyurethane resins are extremely effective binders by themselves, they can be used in combination with one or more of various materials conventionally known as binders for magnetic coating layers. Specific examples of binders usable in combination with the aforementioned polyurethane resins include phosphoric-acid-unmodified polyurethane resins, phenoxy resins, cellulose resins, epoxy resins, vinyl chloride-vinyl acetate copolymer resins, vinylidene chloride resins, polyester resins, polyvinyl butyral resins, and chlorinated vinyl chloride resins.

In addition, other binders also usable in combination with the polyurethane resins include polyisocyanate compounds which generally function as crosslinking components. Among these, trifunctional low-molecular isocyanate compounds are particularly preferred. As examples of such isocyanate compounds, may be mentioned "Colonate L" (trade name, product of Nippon Polyurethane Industry Co., Ltd.), "Desmodule L" (trade name, product of Bayer AG), and "Takenate D102" (trade name, product of Takeda Chemical Industries, Ltd.).

As to the content of phosphoric acid groups or residual groups derived from phosphoric acid, which are contained in the polyurethane resin, one phosphoric acid group or one residual group derived from phosphoric acid must be contained per 3,000–200,000, preferably 5,000–40,000 number average molecular weight of the polyurethane resin. No favorable effects can be expected for the improvement of the dispersibility of magnetic particles if the content is lower than the lower limit or higher than the upper limit.

Production Process of Magnetic Recording Medium

Production of the magnetic recording medium according to the present invention can be conducted in a similar manner to either one of conventional processes. For example, the binder, magnetic particles and if necessary, one or more of various additives are mixed together with an organic solvent to prepare a magnetic coating formulation. A base film such as a polyester film is then coated with the magnetic coating formulation. After drying, a surface treatment such as calender rolling is applied.

As the magnetic particles, $\gamma$-$Fe_2O_3$, mixed crystals of $\gamma Y$-$Fe_2O_3$ and $Fe_3O_4$, cobalt-doped $\gamma$-$Fe_2O_3$ and $Fe_3O_4$, $CrO_2$, barium ferrite, pure iron, other ferromagnetic alloy particles (e.g., Fe-Co, Co-Ni, Fe-Co-Ni, Fe-Co-B, Fe-Co-Cr-B, Mn-Bi, Mn-Ali, Fe-Co-V), iron nitride and other similar magnetic particles are all usable.

As additives which can be added to the magnetic coating formulation as needed, a variety of materials conventionally known as additives for magnetic coating formulations can be suitably used, such as lubricants, abrasives, dispersants, antistatic agents and fillers.

Further, exemplary solvents usable for the preparation of the magnetic coating formulation include ketones, e.g., acetone, methyl ethyl ketone, methyl isobutyl ketone and cyclohexanone; alcohols, e.g., methanol, ethanol, propanol and butanol; esters, e.g., methyl acetate, ethyl acetate and butyl acetate; glycol ethers, e.g., propylene glycol monomethyl ether, ethylene glycol monoethyl ether and dioxane; the acetate esters of glycol ethers, e.g., ethylene glycol monoethyl ether acetate and propylene glycol monomethyl ether acetate; aromatic hydrocarbons, e.g., benzene, toluene and xylene; aliphatic hydrocarbons, e.g., hexane and heptane; nitropropane; tetrahydrofuran; dimethylacetamide; and dimethylformamide.

The present invention will hereinafter be described specifically by the following examples. It should however be borne in mind that the present invention is not limited to the following examples only.

EXAMPLE 1

A 2-l flask equipped with a thermometer, a stirrer, a nitrogen gas inlet tube and a reflux condenser was charged with 316 g of phenylphosphonic acid (product of Nissan Chemical Industries, Ltd.) and 316 g of methyl ethyl ketone, followed by the dropwise addition of a solution of 372 g of "Epicoat 828" (trade name, product of Yuka Shell Epoxy Kabushiki Kaisha, epoxy equivalent: 186) in the same amount of methyl ethyl ketone at 70° C. over 30 minutes. They were reacted at 70° C. for 5 hours.

Thereafter, the solvent was driven off by a rotary evaporator to obtain a viscous reaction product having an acid value of 160.

EXAMPLE 2

A reaction product having an acid value of 184 was obtained in a similar manner to Example 1 except that 306 g of diglycidyl adipate (trade name: "Dinacol EX701", product of Nagase Chemical, Ltd., epoxy equivalent: 153) were used in place of "Epicoat 828".

EXAMPLE 3

A reaction product having an acid value of 195 was obtained in a similar manner to Example 1 except that 252 g of 3,4-epoxycyclohexylmethyl 3,4-epoxycyclohexanecarboxylate (trade name: "Chissonox CX221", product of Chisso Corporation) were used instead of "Epicoat 828".

EXAMPLE 4

A reaction product having an acid value of 42.4 was obtained in a similar manner to Example 1 except that 764 g of "Gafac RE610" (trade name, product of Toho Chemical Industry Co., Ltd.) and 200 g of "Epicoat 1001" (trade name, product of Yuka Shell Epoxy Kabushiki Kaisha, epoxy equivalent: 470) were used in lieu of phenylphosphonic acid and "Epicoat 828", respectively and the reaction was conducted at 60° C. for 3 hours.

EXAMPLE 5

A reaction product having an acid value of 48.5 was obtained in a similar manner to Example 4 except that 321.7 g of a monoester derivative (purity: 95%) of "Gafac RE610" and 200 of "Epicoat 1001" were charged and the reaction was conducted at 60° C. for 2 hours.

EXAMPLE 6

A reaction product having an acid value of 47.2 was obtained in a similar manner to Example 4 except that 100 g of tetraglycidylbenzophenone were used instead of "Epicoat 1001" and the reaction was conducted at 60° C. for 2 hours.

EXAMPLE 7

A reaction product having an acid value of 45.0 was obtained in a similar manner to Example 4 except that the amount of "Gafac RE610" was reduced from 764 g to 718 g, 144 g of the phenol novolak type "Epicoat 154" (trade name, product of Yuka Shell Epoxy Kabushiki Kaisha, epoxy equivalent: 180) were used in lieu of "Epicoat 1001" and the reaction was conducted at 70° C.

EXAMPLE 8

A reaction product having an acid value of 46.2 was obtained in a similar manner to Example 4 except that 696 g of "Gafac RS610" (trade name, product of Toho Chemical Industry Co., Ltd.) and 50 g of diglycidyl orthophthalate (trade name: "Dinacol EX721", product of Nagase Chemicals, Ltd.) were used in place of "Gafac RE610" and "Epicoat 1001", respectively.

EXAMPLE 9

A reaction product having an acid value of 75.8 was obtained in a similar manner to Example 4 except that 595 g of "Gafac RE410" (trade name, product of Toho Chemical Industry Co., Ltd.) and 75.6 g of glycerol triglycidyl ester (trade name: "Dinacol EX314", product of Nagase Chemicals, Ltd.) were used in place of "Gafac RE610" and "Epicoat 1001", respectively and the reaction was conducted at 50° C. for 2 hours.

EXAMPLE 10

A reaction product having an acid value of 71.3 was obtained in a similar manner to Example 9 except that 102 g of sorbitol polyglycidyl ether (trade name: "Dinacol EX611", product of Nagase Chemicals, Ltd.) were used in lieu of and "Dinacol EX314" and the reaction was conducted at 50° C. for 3 hours.

EXAMPLE 11

A flask as in Example 1 was charged with 595 g of "Gafac RE410" and 93 g of "Epicoat 828". They were reacted at 100° C. for 30 minutes to obtain a reaction product having an acid value of 72.9.

EXAMPLE 12

A reaction product having an acid value of 50.2 was obtained in a similar manner to Example 11 except that 718 g of "Gafac RE610" were used instead of "Gafac RE410", the amount of "Epicoat 828" was reduced from 93 g to 74.4 g, and the reaction was conducted at 70° C. for 2 hours.

EXAMPLE 13

A flask as in Example 1 was charged with 158.1 g of phenylphosphonic acid and 632 g of tetrahydrofuran, followed by the dropwise addition of a solution of 74.1 g of glycidol in 296.4 g of tetrahydrofuran at 50° C. over about 2 hours. They were reacted at 50° C. for 1 hour. After confirming the elimination of a spot of glycidol as the raw material by thin layer chromatography on silica gel ("Merck Art 5715", trade name, developer: 1:1 mixed solvent of chloroform and methanol), the solvent was distilled out under reduced pressure from the reaction mixture to obtain a viscous reaction product having an acid value of 280.

EXAMPLE 14

A 1-l separable flask equipped with a thermometer, a stirrer, a nitrogen gas inlet tube and a reflux condenser was charged with 100.9 g of poly(1,4-butylene adipate) (molecular weight: 1,000), 7.3 g of 1,4-butylene glycol, 9.2 g of the reaction product obtained in Example 4, 45.0 g of MDI, 270 g of tetrahydrofuran and 270 g of toluene. After reacting the at 80–85° C. for 12 hours, 100 g of methyl ethyl ketone were added to adjust the solid content to 20%.

The resulting phosphoric-acid-modified polyurethane resin had an acid value of 2.2 (polymer) and a number average molecular weight of 39,000.

After mixing and kneading 750 g of the phosphoric-acid-modified polyurethane resin solution, 600 g of cobalt-modified $\gamma$-$Fe_2O_3$ (trade name: "AX-3000", product of Titan Kogyo K.K., specific surface area: 31 $m^2/g$), 350 g of cyclohexanone and 650 g of methyl ethyl ketone for 72 hours in a ball mill, 20 g of "Desmodule L" were added. The resultant mixture was mixed and kneaded for additional 30 minutes, thereby obtaining a magnetic coating formulation.

A polyester film having a thickness of 9 $\mu$m was coated with the magnetic coating formulation to give a coating thickness of 4 $\mu$m after drying, followed by drying at 90° C. for 8 hours. The film thus coated was then slit 4.0 mm wide into magnetic tapes.

EXAMPLE 15

A 1-l separable flask equipped with a thermometer, a stirrer and a nitrogen gas inlet tube was charged with 294.6 g of "PTG-1000" (trade name for polyether polyol produced by Hodogaya Chemical Co., Ltd., molecular weight: 1,000), 16.3 g of 1,4-butylene glycol, 18.9 g of neopentyl glycol and 24.9 g of the reaction product obtained in Example 12. After heating the contents to 80° C., 162.9 g of MDI which had been heated to 80° C. were added. The resultant mixture was vigorously stirred for 5 minutes and transferred into a vat, in which the mixture was allowed to age at 120° C. for 10 hours.

The resultant resin had an acid value of 1.9 and a number average molecular weight of 45,000 and was in a solid form. It was dissolved in methyl ethyl ketone to give a solid content of 20%, thereby providing a resin solution.

Magnetic tapes were then produced in a similar manner to Example 14.

EXAMPLE 16

A flask as in Example 15 was charged with 318.9 g of poly(1,4-butylene adipate) (molecular weight: 1,000), 23.1 g of 1,4-butylene glycol and 15.7 g of the reaction product obtained in Example 5. The contents were heated to 110° C.

Thereafter, 142.2 g of MDI which had been heated to 110° C. were added into the flask, followed by vigorous stirring for 3 minutes. During the stirring, the reaction temperature arose to 220–230° C. because of heat of the reaction. The reaction mixture was transferred into a vat, in which it was allowed to age at 60° C. for 10 hours. The resin thus obtained had an acid value of 1.6 and a number average molecular weight of 48,000 and was in a solid form. It was dissolved in methyl ethyl ketone to give a solid content of 20%, thereby providing a resin solution.

Magnetic tapes were then produced in a similar manner to Example 14.

EXAMPLE 17

Using 263.5 g of poly(1,4-butylene adipate) (molecular weight: 2,000), 22.1 g of 1,4-butylene glycol, 22.7 g of 1,6-hexylene glycol, 31.1 g of "Epicoat 828", 6.2 g of the reaction product obtained in Example 1 and 154.4 g of MDI, a solid resin having an acid value of 2.0 and a number average molecular weight of 58,000 was obtained in a similar manner to Example 15. It was dissolved in methyl ethyl ketone to give a solid content of 20%, thereby providing a resin solution. Magnetic tapes were then produced in a similar manner to Example 14.

EXAMPLE 18

A flask as in Example 15 was charged with 297.1 g of poly(1,4-cyclohexane dimethanol adipate) (molecular weight: 1,000), 15.0 g of 1,6-hexylene glycol, 13.2 g of neopentyl glycol, 25.3 g of "Epicoat 1001" and 18.3 g of the reaction product obtained in Example 11. After heating the contents to 110° C., 136.9 g of MDI were added and reacted under similar conditions to Example 16.

The reaction mixture was transferred into a vat and was then allowed to cool down. Thereafter, it was allowed to age at 60° C. for 10 hours. The resin thus obtained had an acid value of 1.8 and a number average molecular weight of 52,000 and was in a solid form. It was dissolved in methyl ethyl ketone to give a solid content of 20%, thereby providing a resin solution.

Magnetic tapes were then produced in a similar manner to Example 14.

EXAMPLE 19

A flask as in Example 15 was charged at 70° C. with 261.4 g of poly(1,4-butylene adipate) (molecular weight: 2,000), 25.9 g of 1,6-hexylene glycol, 22.8 g of neopentyl glycol, 32.4 g of diethylene glycol diglycidyl ether (trade name: "YED 205", product of Yuka Shell Epoxy Kabushiki Kaisha, aliphatic epoxy compound, epoxy equivalent: 140) and 10.1 g of "Gafac RE-410" (phosphoric acid ester produced by Toho Chemical Industry Co., Ltd.). The contents were heated to 110° C. over about 10 minutes.

Thereafter, under similar conditions to Example 16, 147.4 g of MDI were added and reacted and the reaction mixture was allowed to age.

The resin thus obtained had an acid value of 1.8 and a number average molecular weight of 47,000 and was in a solid form. It was dissolved in methyl ethyl ketone to give a solid content of 20%, thereby providing a resin solution.

Magnetic tapes were then produced in a similar manner to Example 14.

EXAMPLE 20

A flask as in Example 14 was charged with 640 g of methyl ethyl ketone, 100.5 g of poly(1,4-butylene adipate) (molecular weight: 1,000), 8.4 g of neopentyl glycol, 0.8 g of "Epicoat 828" and 3.2 g of "Gafac RE410". They were reacted at 78° C. for 3 hours. MDI (47.1 g) was added further, followed by a reaction at 78° C. for 15 hours. The resultant resin solution had a solid content of 20%. The polymer had an acid value of 1.9 and a number average molecular weight of 45,000.

Magnetic tapes were then produced in a similar manner to Example 14.

EXAMPLE 21

A flask as in Example 15 was charged at 70° C. with 290.6 g of polycarbonate polyol (product of Toagosei Chemical Industry Co., Ltd.), 16.1 g of 1,4-butylene glycol, 18.6 g of 1,6-hexylene glycol, 2.5 g of "Epicoat 828" and 11.3 g of "Gafac RS-410" (product of Toho Chemical Industry Co., Ltd.). After heating the contents to 110° C. over 10 minutes, the reaction mixture was allowed to age at 110° C. for 10 minutes.

Similarly to Example 16, 160.8 g of MDI were then added and reacted and the reaction mixture was allowed to age.

The resultant resin had an acid value of 2.0 and a number average molecular weight of 45,000 and was in a solid form. It was dissolved in methyl ethyl ketone to give a solid content of 20%, thereby providing a resin solution.

Magnetic tapes were then produced in a similar manner to Example 14.

EXAMPLE 22

In a similar manner to Example 14, a phosphoric-acid-modified polyurethane resin solution was prepared. It was neutralized with caustic potash in an amount equivalent to the acid value.

The solution was diluted with methyl ethyl ketone to give a solid content of 20%. Magnetic tapes were then produced in a similar manner to Example 14.

EXAMPLE 23

Using 281.1 g of poly(1,4-butylene adipate) (molecular weight: 1,000), 12.2 g of 1,4-butylene glycol, 21.2 g of neopentyl glycol, 29.2 g of the reaction product obtained in Example 11 and 156.2 g of MDI, a solid resin having an acid value of 5.5 and a number average molecular weight of 45,000 was obtained in a similar manner to Example 16.

Magnetic tapes were then produced in a similar manner to Example 14.

EXAMPLE 24

A flask as in Example 14 was charged with 94.6 g of poly(1,4-butylene adipate) (molecular weight: 1,000), 8.0 g of 1,4-butylene glycol, 1.1 g of the reaction product obtained in Example 13, 103.7 g of MDI and 225 g of tetrahydrofuran. After reacting them at 65° C. for 10 hours, 375 g of tetrahydrofuran were added to give a solid content of 20%.

The resultant phosphoric-acid-modified polyurethane resin had an acid value of 1.8 (polymer) and a number average molecular weight of 52,000.

Magnetic tapes were then produced in a similar manner to Example 14.

EXAMPLE 25

A flask as in Example 15 was charged with 226.1 g of poly(1,4-butylene adipate) (molecular weight: 1,000), 60.7 g of neopentyl glycol and 7.1 g of the reaction product obtained in Example 13. The contents were then heated to 110° C.

Under similar conditions to Example 16, 206 g of MDI were then added and reacted and the reaction mixture was allowed to age.

The thus-obtained resin had an acid value of 3.1 and a number average molecular weight of 62,000 and was in a solid form. It was dissolved in methyl ethyl ketone to give a solid content of 20%, thereby providing a resin solution.

Magnetic tapes were then produced in a similar manner to Example 14.

EXAMPLE 26

A flask as in Example 15 was charged with 226.1 g of poly(1,4-butylene adipate) (molecular weight: 1,000), 60.7 g of neopentyl glycol, 7.1 g of the reaction product obtained in Example 13 and 5.7 g of tri-n-butylamine. The contents were then heated to Under similar conditions to Example 16, 206 g of MDI were then added and reacted and the reaction mixture was allowed to age.

The thus-obtained resin had an acid value of 3.0 and a number average molecular weight of 59,500 and was in a solid form. It was dissolved in methyl ethyl ketone to give a solid content of 20%, thereby providing a resin solution.

Magnetic tapes were then produced in a similar manner to Example 14.

EXAMPLE 27

In a similar manner to Example 25, a phosphoric-acid-modified polyurethane resin solution was prepared. It was neutralized with triethylamine in an amount equivalent to the acid value. The solution was diluted with methyl ethyl ketone to give a solid content of 20%.

Magnetic tapes were then produced in a similar manner to Example 14.

COMPARATIVE EXAMPLE 1

"Estan-®5701Fl" (trade name, product of The B.F. Goodrich Company) was dissolved in a 70:30 mixture of tetrahydrofuran and cyclohexanone to give a solid content of 20%.

Using 750 g of the resin solution, 600 g of cobalt-modified Y-Fe2O3 ("A-3000" trade name; product of Titan Kogyo K.K.), 650 g of cyclohexanone and 350 g of methyl ethyl ketone, magnetic tapes were then produced in a similar manner to Example 14.

COMPARATIVE EXAMPLE 2

5703"(product of The B.F. Goodrich Company) was dissolved in methyl ethyl ketone to give a solid content of 20%.

Magnetic tapes were then produced in a similar manner to Example 14.

COMPARATIVE EXAMPLE 3

A 1-l separable flask equipped with a thermometer, a stirrer and a nitrogen gas inlet tube was charged with 325.4 g of poly(1,4-butylene adipate) (molecular weight: 1,000), 23.4 g of 1,4-butylene glycol and 6.1 g of "Epicoat 1001". After heating the contents to 80° C., 145.1 g of MDI which had been heated to 80° C. were added and the resultant mixture was vigorously stirred. Thereafter, the reaction mixture was transferred into a vat, in which it was allowed to age at 120° C. for 10 hours. A solid resin having a number average molecular weight of 44,000 was obtained.

Magnetic tapes were then produced in a similar manner to Example 14.

COMPARATIVE EXAMPLE 4

A flask as in Example 14 was charged with 118.4 g of poly(1,4-butylene adipate) (molecular weight: 1,000), 2.1 g of 1,4-butylene glycol, 1.4 g of 2,2-dimethylolpropionic acid, 38.1 g of MDI, 270 g of tetrahydrofuran and 270 g of toluene. After reacting them at 80–85° C. for 12 hours, 100 g of tetrahydrofuran were added to give a solid content of 20%.

The resultant carboxyl-modified polyurethane resin had an acid value of 3.5 and a number average molecular weight of 52,000.

Magnetic tapes were then produced in a similar manner to Example 14.

COMPARATIVE EXAMPLE 5

A flask as in Example 14 was charged with 116.6 g of poly(1,4-butylene adipate) (molecular weight: 1,000), 2.5 g of 1,4-butylene glycol, 2.8 g of 5-sodiumsulfo-1,3-di(2-hydroxyethyl) isophthalate (product of Sumitomo Chemical Co., Ltd.), 38.1 g of MDI, 270 g of tetrahydrofuran and 270 g of toluene. After reacting them at 80–85° C. for 12 hours, 100 g of methyl ethyl ketone were added to give a solid content of 20%.

The resultant sodium sulfonate-modified polyurethane resin had a sodium sulfonate (—SO₃Na) concentration of 0.05 mg eq/g and a number average molecular weight of 48,000.

Magnetic tapes were then produced in a similar manner to Example 14.

COMPARATIVE EXAMPLE 6

A flask as in Example 14 was charged with 468 g of dimethylformamide and 115 g of a hydroxyl-terminated polyurethane 5703", trade name; product of The B.F. Goodrich Company). After dissolving the latter in the former at 80° C. over 2 hours, 8.2 g of the compound represented by the following formula:

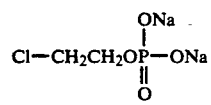

and 1.6 g of pyridine were added. A dehydrochlorination reaction was then conducted at 80° C. for 3 hours, whereby phosphoric acid groups were introduced into both ends of each polyurethane chain, respectively. Subsequent to neutralization with caustic soda, the polymer was poured into a large volume of methanol. Further, the polymer was washed several times with methanol.

After drying the polymer under reduced pressure, methyl ethyl ketone was added to adjust the solid content to 20%.

The sodium-phosphate-modified polyurethane resin thus obtained had a sodium phosphate residuum

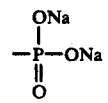

concentration of 1.8 mg eq/g and a number average molecular weight of 58,000.

Magnetic tapes were then produced in a similar manner to Example 14.

With respect to each of the magnetic tapes obtained in the above examples and comparative examples, its surface gloss (60° reflectivity) and square ratio (Br/Bs) were measured to investigate the dispersion and magnetic characteristics, respectively. In addition, its abrasion resistance was also measured to investigate the durability. The results are summarized in Table 1.

The above properties were measured in accordance with the following testing methods, respectively.

SURFACE GLOSS

The surface gloss (60° reflectivity) of the magnetic coating layer of each magnetic tape was measured using a gloss meter ("AU-SCH-2D-GU3", trade name for a digitized automatic colorimetric color difference meter manufactured by Toho Rika Kogyo K.K.).

Better dispersion gives a higher gloss value.

SQUARE RATIO

Measurement was conducted using "Model 3257", trade name for an automatic recording apparatus for d.c. magnetization characteristics manufactured by Yokogawa Electric Corporation.

Better dispersion gives a higher square ratio.

ABRASION RESISTANCE

A crock testing machine of the JSPSR (Japan Society for Promotion of Scientific Research) type manufactured by Daiei Kagaku Seiki Seisakusho K.K. was used. In an environment of 23° C. and 65% RH, the surface of the magnetic coating layer of each magnetic tape was reciprocated and rubbed 200 times under a load of 100 g against a chromium-plated metal cylinder having a diameter of 15 mm. Then, the percentage of any rubbed-off surface area was determined based on the total surface area subjected to the rubbing.

TABLE 1

|  | Surface gloss, % | Square ratio | Abrasion resistance, % |
|---|---|---|---|
| Example 14 | 88 | 0.84 | 3.5 |
| Example 15 | 93 | 0.83 | 4.0 |
| Example 16 | 92 | 0.84 | 1.9 |
| Example 17 | 90 | 0.81 | 1.6 |
| Example 18 | 85 | 0.82 | 1.3 |
| Example 19 | 74 | 0.78 | 2.1 |
| Example 20 | 70 | 0.75 | 5.0 |
| Example 21 | 80 | 0.80 | 4.7 |
| Example 22 | 90 | 0.82 | 3.4 |
| Example 23 | 95 | 0.85 | 3.2 |
| Example 24 | 92 | 0.83 | 2.5 |
| Example 25 | 93 | 0.82 | 3.6 |
| Example 26 | 96 | 0.85 | 3.3 |
| Example 27 | 98 | 0.86 | 3.4 |
| Comp. Ex. 1 | 16 | 0.68 | 1.5 |
| Comp. Ex. 2 | 20 | 0.72 | 3.2 |
| Comp. Ex. 3 | 17 | 0.65 | 2.4 |
| Comp. Ex. 4 | 50 | 0.74 | 3.5 |
| Comp. Ex. 5 | 68 | 0.76 | 8.0 |
| Comp. Ex. 6 | 52 | 0.74 | 5.2 |

It is clearly envisaged from Table 1 that the magnetic tapes according to the present invention, namely, those of Examples 14–27 are all excellent in dispersion and especially the magnetic tapes of Examples 16–18 in which phosphoric-acid-modified and epoxy-modified polyurethane resins were used respectively are also excellent in durability.

We claim:

1. A magnetic recording medium comprising a magnetic layer composed principallyof magnetic particles and a binder, characterized in that at least a portion of the binder is a polyurethane resin synthesized from a reactant mixture of components (1), (2), (3) and (4) set out below, containing one phosphoric acid group or one residualg roup derived from phosphoric acid per 3,000–200,000 number average molecular weight of the polyurethane resin, and having a number average molecular weight of 4,000–150,000:

(1) a phosphorus compound (a) represented by a structural formula set out below or a phosphorus compound (b) represented by a structural formula set out below:

Phosphorus compound (a): a compound ($a_1$) alone or a mixture of the compound ($a_1$) and another compound ($a_2$):

Compound ($a_1$): 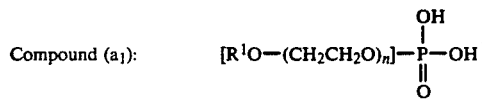

Compound ($a_2$): 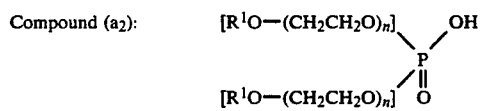

wherein $R^1$ is a hydrogen atom, a phenyl group, an aklyl group having 1–40 carbon atoms, or an alkylphenyl group having 1–40 carbon atoms, and n is an integer of 0–30;

Phosphorus compound (b):

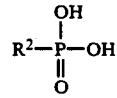

wherein $R^2$ is a phenyl group, an alkyl group having 1–40 carbon atoms, or an alkylphenyl group having 1–40 carbon atoms;

(2) an epoxy compound having at least two epoxy groups and/or an epoxy compound having one epoxy roupand at least one hydroxyl group;

(3) a bifunctional isocyanate compound and/or a trifunctional isocyanate compound; and (4) a polyfunctional hydroxy compound having a number average molecular weight of 400–5,000.

2. The magnetic recording medium according to claim 1, wherein the reactant mixture further comprises a component (5) a chain extender.

3. The magnetic recording medium according to claim 1, wherein phosphoric acid groups or residual groups derived from phosphoric acid, said groups being contained in the polyurethane resin, have been at least partly neutralized with a base.

4. The magnetic recording medium according to claim 2, wherein phosphoric acid groups or residual groups derived from phosphoric acid, said groups being contained in the polyurethane resin, have been at least partly neutralized with a base.

* * * * *